(12) United States Patent
Classen et al.

(10) Patent No.: US 6,695,910 B2
(45) Date of Patent: Feb. 24, 2004

(54) SULFOALUMINOUS CLINKER WITHOUT IRON AND WITHOUT FREE LIME, ITS PROCESS OF PREPARATION AND ITS USE IN WHITE BINDERS

(75) Inventors: Bruno Classen, Neauphle le Chateau (FR); Pierre Colombet, Longnes (FR)

(73) Assignee: Ciments Francais, Puteaux (FR)

( * ) Notice: Subject to any disclaimer, the term of this patent is extended or adjusted under 35 U.S.C. 154(b) by 0 days.

(21) Appl. No.: 10/278,836

(22) Filed: Oct. 24, 2002

(65) Prior Publication Data

US 2003/0183131 A1 Oct. 2, 2003

(30) Foreign Application Priority Data

Oct. 24, 2001 (FR) .............................. 01 13711

(51) Int. Cl.⁷ .......................... C04B 7/345; C04B 28/00
(52) U.S. Cl. ....................... 106/739; 106/693; 106/695; 106/712; 106/735
(58) Field of Search ................. 106/739, 693, 106/695, 712, 735

(56) References Cited

U.S. PATENT DOCUMENTS

| | | |
|---|---|---|
| 3,155,526 A | 11/1964 | Klein |
| 3,251,701 A | 5/1966 | Klein |
| 3,857,714 A | 12/1974 | Mehta |
| 3,860,433 A | 1/1975 | Ost et al. |
| 3,944,426 A | 3/1976 | Nickelsen et al. |
| 4,404,031 A * | 9/1983 | Sudoh et al. ............... 106/715 |
| 4,419,136 A | 12/1983 | Rice |
| 4,798,628 A * | 1/1989 | Mills et al. ................. 106/692 |
| 4,921,537 A * | 5/1990 | Horiguchi et al. .......... 106/725 |
| 4,957,556 A | 9/1990 | Kunbargi |
| 5,114,487 A * | 5/1992 | Gartshore et al. .......... 106/695 |
| 6,149,724 A * | 11/2000 | Ulibarri et al. ............. 106/693 |

FOREIGN PATENT DOCUMENTS

| | | | |
|---|---|---|---|
| JP | 56014460 A | * | 2/1981 |
| JP | 57200252 A | * | 12/1982 |

OTHER PUBLICATIONS

Chemical Abstracts, vol. 98, No. 22, May 30, 1983, Columbus, Ohio, US; abstract No. 184597c, p. 310; XP002206769, Abrege & JP 57 200252 A (Nihon Cement Co) 12, 8, 1982.
Chemical Abstracts, vol. 95, No. 4, Jul. 27, 1981, Coloumbus, Ohio, US; abstract No. 29220u, p. 255; XP002206770 Abrege & JP 56 014460 A (I. Ikeda) Feb. 12, 1981.
Database WPI, Week 199002, Derwent Publications Ltd., London GB; AN 1990–010958, XP002206771 & JP 01 290543 A (Chichibu Cenemt KK), abrege, Nov. 22, 1989.

* cited by examiner

*Primary Examiner*—Anthony J. Green
(74) *Attorney, Agent, or Firm*—Young & Thompson

(57) ABSTRACT

The lightly colored sulfoaluminous clinker contains: more than 55% by weight of calcium sulfoaluminate phase ($C_4A_3S$), more than 10% by weight of belite phase ($C_2S$), less than 10% by weight of anhydrite ($C\bar{S}$), and contains practically no ferrite phase, nor a gehlenite phase ($C_2AS$), nor free lime. It is prepared by a process of roasting carried out at temperatures comprised between about 1250° C. and 1350° C. It can be used for a wide range of applications by combining it with a source of calcium sulfate and/or Portland cement, to obtain binders having specific properties (color, setup time, mechanical strength, expansion or contraction . . . ).

17 Claims, 1 Drawing Sheet

SULFOALUMINOUS CLINKER WITHOUT IRON AND WITHOUT FREE LIME, ITS PROCESS OF PREPARATION AND ITS USE IN WHITE BINDERS

BACKGROUND OF THE INVENTION

The present invention relates to a new sulfoaluminous clinker, its process of preparation and its use in binders, in particular in binders that are lightly tinted, lightly colored or white.

DESCRIPTION OF THE RELATED ART

Hydraulic binders (including cements) are mineral powders which react with water so as to form a malleable paste which hardens after several hours.

The terms "hydraulic binder" and "cement" are frequently confused. Generally speaking, the hydraulic binders are comprised of cements with mineral additives. The production of the cement consists in roasting a mixture, comprised of suitable materials, in a rotating kiln, at high temperature (higher than 1450° C.). The nodules obtained after roasting, called clinker nodules, are ground to a suitable fineness (or specific surface) so as to activate the affinity of the cement for water. The cement is thus a ground clinker, with possible mineral additions.

Cements are illustrated conventionally by two types, Portland cements and aluminous cements.

To facilitate explanation, the standard abbreviations used in the text that follows are as follows:

| | |
|---|---|
| C represents CaO | $\overline{S}$ represents $SO_3$ |
| A represents $Al_2O_3$ | H represents $H_2O$ |
| S represents $SiO_2$ | T represents $TiO_2$ |
| F represents $Fe_2O_3$ | |

Cements of the Portland type are comprised by four principal phases, alite $C_3S$ (40–70%), belite $C_2S$ (up to 30%), tricalcium aluminate $C_3A$ (2–15%) and ferrite $C_4AF$ (up to 15%). Gypsum is conventionally added (up to 5%) during grinding the clinker.

Cements of the aluminous type cover a range of binders which includes monocalcium aluminate CA as the principal constituent. The other principal phases of this range of cements are the ferrite phase $C_4AF$, and the calcium dialuminate phase $CA_2$.

A new type of cement has been created in the past 70 years. It is characterized by one of its phases called calcium sulfoaluminate $C_4A_3\overline{S}$ (Klein phase). The other phases are generally $C_2S$, $C_4AF$, CA, $CA_2$, $C_{12}A_7$, $C\overline{S}$ and free lime. Calcium sulfoaluminate hydrates differently as a function of the other phases present in the binder (binder=cement+ addition of active minerals):

if $C_4A_3\overline{S}$ is the only reactive hydraulic phase, the products of hydration are calcium monosulfoaluminate and aluminum hydroxide:

(1)

This reaction begins very slowly and the paste remains malleable for a fairly long period of time.

In the presence of gypsum (or other calcium sulfate phases) $C_4A_3S$ gives place to ettringite as the lower ratio gypsum/sulfoaluminate is greater than 2, and gives ettringite and calcium monosulfoaluminate in contrary case:

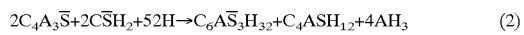

(2)

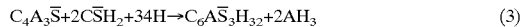

(3)

Reactions (2) and (3) begin more rapidly than reaction (1), and after beginning, are fairly rapid. As a consequence, the $C_4A_3\overline{S}$ base cements in the presence of calcium sulfate are the cements that set up rapidly with a period of malleability of more than 30 minutes. Moreover, with an excess of gypsum (molar ratio of calcium sulfate/calcium sulfoaluminate>2), they increase in volume.

Mixtures of $C_4A_3\overline{S}$ and lime (calcium oxide) give place to a hydraugarnet phase ($C_3AH_6$) and to an Afm phase ($C_3A.\frac{1}{2}C\overline{S}.\frac{1}{2}CH.xH$):

(4)

Mixtures of $C_4A_3\overline{S}$, lime and calcium sulfate hydrate very rapidly to form ettringite:

(5)

Here again, properties of expansion can be obtained if lime and the calcium sulfate are in excess.

Reactions (4) and (5) are very rapid and lead very quickly to setting up (which is to say in several minutes) and give rise to cements that harden very rapidly. Lime can be present in the binder as a portion of the composition, or can be the result of the dissolution of another phase: the principal phase of Portland cement $C_3S$, once in contact with water, liberates calcium hydroxide (the hydrated form of lime) which in turn accelerates the formation of hydrates according to reactions (4) or (5).

As a result, the kinetics of hydration of $C_4A_3\overline{S}$ depend largely on the phases present in the binder. This leads to different applications according to whether it is desired to obtain rapid hardening, rapid setup and/or properties of expansion. Several examples are cited hereafter:

U.S. Pat. Nos. 3,251,701, 3,155,526, 4,419,136 and 3,857,714 disclose expanding binders produced from a clinker including the calcium sulfoaluminate content of the clinker which is mixed with other constituents (for example gypsum or Portland cement) so as produce ettringite (reaction (3) or (5)) with an excess of gypsum and/or lime. This clinker, containing not only $C_4A_3\overline{S}$ but also lime and anhydrite, has limited application because of the long setup time (reaction (1)), which is required for numerous applications, is impossible to obtain.

U.S. Pat. No. 3,860,433 discloses a very high strength cement, with rapid setup comprised by 20 to 40% $C_4A_3\overline{S}$, 10 to 35% $C\overline{S}$, the rest being essentially $C_2S$. Because the $C\overline{S}$ content is high, the crushed clinker hydrates according to reactions (2) or (3). Obtaining a binder with a long setup time, such as reaction (1) favors, is impossible.

Ferro- and sulfoaluminous clinkers developed by CBMA (China Building Materials Academy) are comprised principally of $C_4A_3\overline{S}$, $C_2S$ and $C_4AF$ (see Table 1). They are very useful for general applications and specific applications such as construction in winter, the production of subterranean structures, marine construction and applications for reinforced concrete resistant to corrosion. However, their $C_4AF$ content is always greater than 3%. This gives them a dark color. It is thus not of interest to incorporate clinkers in binders that must remain lightly colored or pigmented, such as coatings.

TABLE 1

Compositions of ferro- and sulfoaluminous clinkers of CBMA

|  | $C_4A_3\bar{S}$ | $C_2S$ | $C_4AF$ |
|---|---|---|---|
| Sulfoaluminous | 50–70% | 10–25% | 3–10% |
| Ferroaluminous | 45–60% | 10–20% | 15–25% |

WO 90/15033 discloses a clinker roasted between 1000 and 1200° C., comprised with a high content of $C_4A_3\bar{S}$, with a molar ratio A/F greater than 0.64. There thus exists a ferrite phase in this clinker. The roasting temperature being very low, free lime must be present in a substantial quantity in the clinker, which prevents its use for applications with long setup times.

The patent EP 0 181 739 also discloses a clinker having a high content of $C_4A_3\bar{S}$, with less than 1% free lime. However, this clinker includes iron (ferrite phase) which gives it a dark color (see Table 7 hereafter), and other phases such as $CA_2$, CA and $C_2AS$ in large quantities (of the order of 20%).

It will thus be seen that each calcium sulfoaluminate base cement is adapted for limited uses. The producer must thus give users a range of sulfoaluminous clinkers of different types to suit various desired uses (short or long setup time, expansion, rapid hardening, high strength . . . ).

SUMMARY OF THE INVENTION

A first object of the invention is thus to provide a unique sulfoaluminous clinker, which permits, by combining it with calcium sulfate and/or Portland cement in suitable proportions, obtaining binders having desirable properties, particularly as to contraction/expansion, setup time, hardening and mechanical strength.

Another object of the invention is to provide a sulfoaluminous clinker of light color, even substantially white, which is to say in which the iron oxides or the other colored oxides such as for example chromium oxide, manganese oxide, are practically absent.

These objects are achieved by the sulfoaluminous clinker according to the invention, including:
  more than 55% by weight of calcium sulfoaluminate phase ($C_4A_3\bar{S}$)
  more than 10% by weight of belite phase ($C_2S$)
  less than 10% by weight of anhydrite ($C\bar{S}$) and including practically no ferrite phase, nor gehlenite phase ($C_2AS$), nor free lime.

DESCRIPTION OF THE PREFERRED EMBODIMENTS

Figure 1:
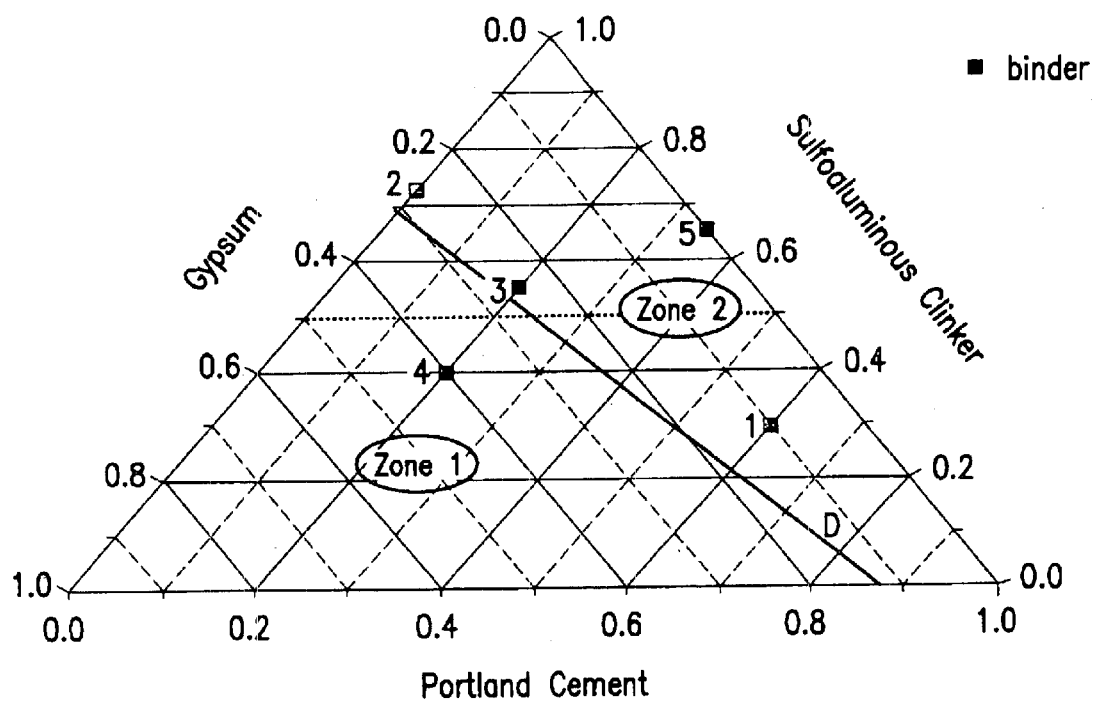
FIG. 1 illustrates the expansion/contraction behavior of inventive binder.

With practically white clinker (see Table 7 hereafter), it is possible to produce very lightly colored binders, or more colored or darker binders, simply by adding a coloring agent, which is impossible with dark colored clinkers.

The clinker according to the invention containing practically no free lime, its use is not limited to applications in which rapid setup is necessary. Thus, in the presence of free lime, reactions (4) and (5) cannot be avoided. Thus reaction (1) is favored, which permits the cement to set up slowly, a property generally required in numerous applications.

A low anhydrite content (<10%) permits the user to select for example, between reaction (1) and reactions (2) and (3) or between reaction (4) and reaction (5) as the predominant reaction. Thus, the user can control the expansion or contraction phenomenon, which depends principally on the molar ratio calcium sulfate/calcium sulfoaluminate ($C\bar{S}/C_4A_3\bar{S}$).

Moreover, if the anhydrite content is more than 10%, reaction (1) is never predominant, and one can never obtain binders with a slow setup with this clinker.

A high content of $C_4A_3\bar{S}$ (>55% by weight) according to the invention enlarges the range of the properties of this clinker during its use in a binder. Thus, on the one hand the ratio $C\bar{S}/C_4A_3\bar{S}$ can be adjusted more easily if the $C_4A_3\bar{S}$ content is high, which permits the user better control of the expansion/contraction phenomenon. On the other hand, standards have shown that the $C_4A_3\bar{S}$ content of the clinker must be greater than 55% to obtain binders (compounds of said clinker, of Portland cement, and/or of calcium sulfate) with very rapid setup and hardening properties according to reaction (5).

For example, a mixture of 30% of a sulfoaluminous clinker with 60% of Portland cement and 10% of gypsum does not give a very short setup time (less than 10 minutes) if the $C_4A_3\bar{S}$ content of the clinker is below 55%.

It has been seen that the presence of belite ($C_2S$) in the clinker is altogether beneficial. On the one hand, this phase traps the lime and it is thus easier to obtain a clinker without free lime when the mixture contains silica. On the other hand, belite hydrates very slowly and hence is responsible for long term high mechanical strength.

Preferably, the sulfoaluminous clinker according to the invention includes:
  from about 55% to 72% by weight of calcium sulfoaluminate phase ($C_4A_3\bar{S}$)
  from about 10% to 20% by weight of belite phase ($C_2S$)
  from about 2% to 9% by weight of anhydrite ($C\bar{S}$).

Preferably, it includes less than 5% by weight of gehlenite phase ($C_2AS$). When this value is less than 5%, the gehlenite phase is practically not detectable by present methods of x-ray diffraction. Preferably, it includes the content of free lime less than 0.2%, preferably less than 0.15%, or even less than about 0.1% by weight, and an iron content (expressed as $Fe_2O_3$) less than 0.3%, preferably 0.25%, or even less than about 0.20% by weight.

To obtain the lightest color possible, the total content of colored oxides other than iron oxide, of the clinker is preferably less than 0.7%, preferably less than about 0.5% by weight (namely, in particular, a content less than 0.5%, preferably below 0.3% of $TiO_2$, less than 0.1% of MnO, less than 0.05% of $Cr_2O_3$ . . . ).

The present invention also relates to a process for the preparation of said sulfoaluminous clinker.

The preparation of sulfoaluminous clinker including more than 55% of $C_4A_3\bar{S}$ and practically no free lime, and this from a mixture containing no $Fe_2O_3$, is not easy.

Thus, it would be desirable to increase the roasting temperature so as to combine all the lime in a reasonable time, but the belite phase risks decomposing to give gehlenite.

At lower temperatures, the decomposition of the sulfospurrite to form belite is facilitated by the presence of iron oxides, lowering the decomposition temperature of the sulfospurrite $C_5S_2\bar{S}$ to 1230° C. Thus iron facilitates roasting sulfoaluminous clinkers. But the presence of iron oxides in the clinker of the invention is precisely what the inventors have sought to avoid.

It has however been discovered that the sulfoaluminous clinker according to the invention could be prepared by a process comprising:

the mixture of starting materials, for example limestone, bauxite, sand and gypsum, in concentrations such that the following weight proportions of oxides will be respected:

$4 \leq S \leq 10$
$34 \leq A \leq 49$
$37 \leq C \leq 45$
other oxides $\leq 2$
balanced to 100 being $\bar{S}$ then roasting this mixture between about 1250 and 1350° C., for a time sufficiently long to combine all the lime, followed by rapid cooling of the mixture in a non-oxidizing atmosphere.

Preferably, the mixture will moreover show the following weight proportions in C, A and S oxides:

$A \leq 1.33*S+41$
$A \leq -2.33*S+62$
$C \leq 0.83*S+37$
$C \geq 3*S+13$
$C \geq -0.81*A+72$
$C \leq -0.6*A+67$ It is essential that the roasting temperature be comprised between 1250 and 1350° C. Thus, below 1250° C. sulfospurrite $C_5S_2\bar{S}$ can form, which has very weak hydraulic properties. Above 1350° C. gehlenite $C_2AS$ forms, which is not reactive with water. Between 1250 and 1350° C. belite forms as the principal silicate phase. Moreover, at a temperature greater than 1350° C., the sulfate is volatile in the form of $SO_2$ gas, which promotes the decomposition of the calcium sulfoaluminate phase, and which is a harmful gas whose emission into the environment must be limited.

The duration of roasting must be sufficiently long to combine all the lime and to obtain a clinker having less than 10% anhydrite. This duration depends on the cooking conditions, particularly the air flow rate in the kiln and the flame temperature, however a duration of 30 minutes to 1 hour is generally sufficient.

Roasting is followed by rapid cooling. Thus, it has been discovered that the conditions of quenching influence the coloration of the clinker according to the invention. Rapid cooling in a non-oxidizing atmosphere renders the clinker more faintly colored. Cooling can be carried out by water quenching, or under a nitrogen atmosphere.

The last step consists in grinding the clinker to the required fineness to activate its hydraulic properties. The more the clinker has a high specific purpose (measured by the Blaine method), the better is its reactivity from a hydraulic viewpoint. Preferably, the clinker is ground until a specific Blaine surface greater than about 3000 cm²/g is obtained, preferably greater than about 5000 cm²/g.

The present invention also relates to the use of the clinker according to the invention for the preparation of a binder by mixing said clinker with a material which is a source of calcium oxide (for example Portland cement) and/or with a source of calcium sulfate (for example gypsum) According to the proportions of these three components, the binders obtained can have different properties, for example:

the ground sulfoaluminous clinker according to the invention, alone, is a cement that is slow to set up and harden (at least 5 hours)

a binder comprising 75 to 90% of sulfoaluminous clinker according to the invention, and 25 to 10% by weight of a source of calcium sulfate, has a setup time less than or equal to three hours and permits preparing, according to the EN 196 standard, a mortar which has a resistance to compression after 28 days greater than or equal to about 50 MPa;

a binder comprising 20 to 40% (preferably about 30%) of sulfoaluminous clinker according to the invention, 50 to 70% (preferably about 60%) of Portland cement and 5 to 25% (preferably about 10%) of a source of calcium sulfate, has a setup time less than or equal to 10 minutes, and permits preparing, according to the EN 196 standard, a mortar which has high mechanical performance in a short time;

a binder comprising 55 to 90% (preferably about 60%) of sulfoaluminous clinker according to the invention, 5 to 30% (preferably about 20%) of Portland cement and 10 to 30% (preferably about 20%) of a source of calcium sulfate has a setup time comprised between about 30 minutes and one hour, and permits preparing, according to the EN 196 standard, a mortar having a resistance to compression at 5 hours greater than about 20 MPa. EN 196 standard is a European standard for testing cements.

EXAMPLES

Example 1

Preparation of a sulfoaluminous clinker according to the invention and of binders based on this clinker.

A mixture constituted by limestone, sand, white alumina and gypsum, according to the composition given in Table 2, is roasted at 1300° C. for one hour.

TABLE 2

| | Composition of the mixture | | | | |
|---|---|---|---|---|---|
| | Limestone | Sand | White alumina | Gypsum | Mixture |
| % by weight of the mixture | 43.1 | 4.9 | 19.6 | 32.4 | 100 |
| Loss upon firing | 43.43 | 0.14 | 0.63 | 21.39 | 23.10 |
| $SiO_2$ | 0.00 | 98.09 | 0.08 | 0.59 | 4.97 |
| $Al_2O_3$ | 0.06 | 0.61 | 98.65 | 0.05 | 32.1 |
| $Fe_2O_3$ | 0.04 | 0.06 | 0.09 | 0.01 | 0.05 |
| $TiO_2$ | 0.01 | 0.02 | 0.00 | 0.00 | 0.01 |
| MnO | 0.00 | 0.00 | 0.01 | 0.02 | 0.01 |
| CaO | 55.78 | 0.02 | 0.15 | 33.09 | 30.57 |
| MgO | 0.61 | 0.00 | 0.03 | 0.14 | 0.29 |
| $SO_3$ | 0.00 | 0.00 | 0.07 | 44.89 | 8.79 |
| $K_2O$ | 0.01 | 0.42 | 0.00 | 0.00 | 0.03 |
| $Na_2O$ | 0.00 | 0.02 | 0.35 | 0.00 | 0.10 |
| $P_2O_5$ | 0.00 | 0.01 | 0.00 | 0.00 | 0.00 |
| SrO | 0.00 | 0.01 | 0.00 | 0.08 | 0.01 |

X-ray diffraction analysis of the clinker shows the presence of $C_4A_3\bar{S}$, $C_2S$, $C\bar{S}$, CA, $CA_2$, residual quartz and corundum. No ferrite phase, nor gehlenite, nor free lime were detected. The chemical analyses show that the composition of the clinker obtained is:

$C_4A_3\bar{S}=66\%$
$C_2S=15\%$
$C\bar{S}=3\%$

Residual phases=16% (CA, $CA_2$, quartz, corundum)

Different binders have been prepared with the above sulfoaluminous clinker, in mixture with gypsum and white Portland cement. Their setup times have been measured by texturometry on pastes and their mechanical performances have been determined on mortars prepared according to the EN 196 standard, namely with silica sand CEN of 0 to 2 mm, a mass ratio of water/binder of 0.5 and a mass ratio binder/sand of ⅓. The results are given in the following Table 3.

TABLE 3

Composition and performance of the binders

| Binder no. | 1 | 2 | 3 | 4 | 5 |
|---|---|---|---|---|---|
| Composition % | | | | | |
| Sulfoaluminous clinker | 100 | 75 | 60 | 70 | 30 |
| Gypsum | / | 25 | 20 | 10 | 10 |
| White Portland cement | / | / | 20 | 20 | 60 |
| Setup time | | | | | |
| Beginning | 23 h | 2 h 10 | 30 min | 50 min | 4 min |
| End | 23 h 15 | 3 h | 60 min | 110 min | 6 min |
| Resistance to compression (MPa) | | | | | |
| at 3 hours | — | — | 4.7 | — | — |
| at 5 hours | — | — | 24 | 5.2 | 9 |
| at 1 day | — | 26 | — | 37 | 18 |
| at 7 days | — | 67 | — | — | — |
| at 28 days | 50 | 74 | 57 | 45 | 54 |

(—) = not measured

There will be noted particularly the rapidity of setup of binder 5 without prejudice to a long-term high resistance to compression.

Example 2

This example has for its object to show the effect of the presence of belite compared to that of gehlenite on the long-term mechanical performance of the sulfoaluminous clinkers of the present invention.

The clinker of the present invention differs from the sulfoaluminous clinker described in the patent EP-B-0 181 739 by the nature of the principal silicate phase; EP-B-0 181 739 includes gehlenite $C_2AS$ whilst the clinker of the invention includes more than 10% of belite (see Table 4).

TABLE 4

Comparison of the mineralogical composition of clinkers according to the invention (Example 1) and according to EP-B-0 181 739

| Constituents | Clinker according to the invention | Clinker according to EP-B-0 181 739 |
|---|---|---|
| $C_4A_3\bar{S}$ | 66% | 60% |
| CA, $CA_2$, $C_{12}A_7$ | 15% | 14% |
| $C_2S$ (belite) | 15% | — |
| $C_2AS$ (gehlenite) | (nd) | 17% |
| $C\bar{S}$ | 3% | — |
| $C_4AF$ | — | 3% |
| CT | — | 4% |
| Others (Ca, Mg, K, Na,...) | 1% | 2% |

(nd = not detected)

To these two clinkers was added gypsum (10% by weight) so as to obtain a binder having a molar ratio of calcium sulfate/sulfoaluminate substantially equal to 2 (stoechiometric proportions according to reaction (3)).

The development of the resistance to compression of the two binders (measured on a mortar prepared according to the EN 196 standard) during the first month were compared (Table 5).

TABLE 5

Comparison of the development of compressive strength

| Age | Clinker according to the invention | Clinker described in EP-B-0 181 739 |
|---|---|---|
| 1 day | 28 MPa | 38 MPa |
| 7 days | 65 MPa | 57 MPa |
| 28 days | 74 MPa | 58 MPa |

It will be noted that the mechanical strength of the binder containing clinker according to EP-B-0 181 739 does not develop after 7 days whilst that of the corresponding binder of the present invention continues to increase, to give a resistance to compression greater by more than 25% at the end of four weeks.

Example 3

There is prepared a mixture of gypsum, white alumina, limestone and limestone containing silica. The composition of this mixture is given in Table 6.

TABLE 6

Composition of the mixture

| | Limestone | Limestone containing silica | White alumina | Gypsum | Mixture |
|---|---|---|---|---|---|
| % by weight of the mixture | 17.8 | 29.6 | 30.3 | 29.3 | |
| Loss upon firing | 43.29 | 35.10 | 0.63 | 20.30 | 23.05 |
| $SiO_2$ (S) | 0.34 | 19.24 | 0.08 | 1.97 | 6.35 |
| $Al_2O_3$ (A) | 0.08 | 0.47 | 98.56 | 0.37 | 29.43 |
| $Fe_2O_3$ (F) | 0.11 | 0.15 | 0.09 | 0.11 | 0.12 |
| $TiO_2$ | 0.01 | 0.03 | 0.00 | 0.01 | 0.01 |
| MnO | 0.02 | 0.00 | 0.01 | 0.01 | 0.01 |
| CaO (C) | 55.89 | 44.83 | 0.15 | 33.11 | 30.9 |
| MgO | 0.20 | 0.21 | 0.03 | 1.38 | 0.41 |
| $SO_3$ ($\bar{S}$) | 0.08 | 0.05 | 0.07 | 41.90 | 9.4 |
| $K_2O$ | 0.00 | 0.04 | 0.00 | 0.05 | 0.02 |
| $Na_2O$ | 0.00 | 0.01 | 0.35 | 0.03 | 0.11 |
| $P_2O_5$ | 0.00 | 0.02 | 0.00 | 0.01 | 0.01 |
| SrO | 0.02 | 0.08 | 0.00 | 0.60 | 0.16 |

This mixture thus includes weight proportions of the following oxides (%): S=8.25; A=38.26; F=0.16; C=40.17; $\bar{S}$=12.22; others=0.95.

This mixture was roasted at 1300° C. for one-half hour. Then the clinker was ground to a Blaine specific surface equal to 5000 cm²/g.

X-ray diffraction of the clinker shows that it is comprised of calcium sulfoaluminate, belite, anhydrite and calcium aluminate phases (CA, $CA_2$). The presence of uncombined alumina is also observed. Neither free limestone nor ferrite phase were detected. The content of $C_4A_3\bar{S}$, $C_2S$, and $C\bar{S}$ is:

$C_4A_3\bar{S}$=57%
$C_2S$=18%
$C\bar{S}$=8%
Residual phases=17%

The whiteness index of the specimen is measured, according to the CIE 1931 standard under illuminant C (near natural light) at an angle of 45°. The color characteristics are given in the L-a-b system and are compared to those of a white Portland cement and to those of a sulfoaluminous clinker containing iron (see Table 7). The value L quantifies the luminance of the specimen, whilst a and b describe the color. Thus, the studied specimens are the whiter as L is nearer to 100 and as a and b are near to zero.

TABLE 7

Color characteristics of the cements

|   | Sulfoaluminous clinker according to the invention | White Portland cement | Sulfoaluminous clinker according to EP-B-0 181 739 (containing iron) |
|---|---|---|---|
| L | 96.22 | 93.65 | 78.1 |
| a | −1.21 | −2.54 | 0.1 |
| b | 2.05 | 4.33 | 15.4 |

Example 4

Preparation of other clinkers according to the invention.

Three clinkers were prepared from gypsum, white alumina, and two different limestones: one containing silica and the other not containing it.

The mixture was roasted at 1300° C. for 30 minutes. Then each clinker was ground to a Blaine specific surface equal to 5000 cm²/g. Their mineralogical compositions (content of belite, anhydrite and calcium sulfoaluminate) are given in Table 8.

TABLE 8

Composition of obtained clinkers

| Clinker | $C_2S$ (%) | $C\bar{S}$ (%) | $C_4A_3\bar{S}$ (%) | Residual phases |
|---|---|---|---|---|
| 1 | 11.5 | 4 | 70 | 15.5 |
| 2 | 12.5 | 7 | 61.5 | 19 |
| 3 | 17.5 | 7.5 | 57.5 | 17.5 |

From these clinkers, two types of binders have been prepared:

Type A binder: binder with rapid setup and hardening comprised b 60% Portland cement, 30% sulfoaluminous clinker according to the invention and 10% gypsum;

Type B binder: binder constituted by each clinker and by gypsum in stoechiometric proportions according to reaction (3), which hardens slowly.

For each binder A, have been determined the setup times (initial and final) and the compressive strength after 5 hours of hydration, and for each binder B the setup times and the compressive strength at 28 days (for mortars prepared according to the EN 196 standard). The results are given in Tables 9 and 10.

TABLE 9

Type A binders

| Binder | No. of clinker used | Setup time Initial | Setup time Final | Compressive strength at 5 hours |
|---|---|---|---|---|
| A1 | 1 | 5 min. 30 s | 7 min. | 5.5 MPa |
| A2 | 2 | 8 min. | 10 min. | 6 MPa |
| A3 | 3 | 7 min. | 10 min. | 5 MPa |

TABLE 10

Type B binders

| Binder | No. of clinker used | Initial setup time | Compressive strength at 28 days |
|---|---|---|---|
| B2 | 2 | 110 min. | 67 MPa |
| B3 | 3 | 110 min. | 63 MPa |

Thus, with each clinker, it is possible to produce a binder with rapid setup and hardening, as well as a binder with slow setup having long-term high compression strength. By varying the content of Portland cement and calcium sulfate of the binder, the setup time can be fixed as well as the hardening time to respond to the requirements of any desired application. This clinker is thus somewhat a "universal" clinker.

Example 5

The sulfoaluminous clinker of Example 1 was used to prepare five different binders so as to test their properties of contraction and expansion. The compositions of the binders are given in Table 11.

TABLE 11

Composition of the binders (% by weight)

|   | Binder 1 | Binder 2 | Binder 3 | Binder 4 | Binder 5 |
|---|---|---|---|---|---|
| Portland cement | 60% | 0% | 20% | 20% | 35% |
| Sulfoaluminous clinker | 30% | 73% | 55% | 40% | 65% |
| Gypsum | 10% | 27% | 25% | 40% | 0% |

The hydrated mortars, prepared according to the EN 196 standard (weight ratio of binder/sand=0.33 and water/binder=0.5) have been held in a controlled atmosphere (50% relative humidity at 20° C.) to measure the contraction or immersed in water at 20° C. to measure their expansion. The results are collected in Tables 12 and 13 hereafter.

TABLE 12

Measurement of expansion ($\mu$m/m).

| Duration of treatment | Binder 1 | Binder 2 | Binder 3 | Binder 4 | Binder 5 |
|---|---|---|---|---|---|
| 2 days | 40 | 60 | −30 | 620 | −70 |
| 7 days | 60 | 50 | −10 | 760 | 10 |
| 28 days | −20 | 20 | 10 | 820 |   |

TABLE 13

Measurement of contraction (μm/m)

| Duration of treatment | Binder 1 | Binder 2 | Binder 3 | Binder 4 | Binder 5 |
|---|---|---|---|---|---|
| 2 days | 60 | 160 | 245 | 105 | 270 |
| 7 days | 250 | 350 | 315 | 150 | 500 |
| 28 days | 390 | 510 | 380 | 240 | |

As can be seen in FIG. 1, the binders having low properties of contraction/expansion are compositions near line D in the ternary system Portland cement-sulfoaluminous clinker-gypsum.

In zone 1, the corresponding binders have properties of expansion (compare binder 4). On the contrary, in zone 2, there is observed substantial contraction (compare binder 5).

The ternary diagram of FIG. 1 thus permits:

knowing the composition of a binder, which is to say its properties as to gypsum, sulfoaluminous clinker according to the invention, and Portland cement, to foretell its contraction or expansion behavior;

or conversely, as a function of specifications imposing limit values of contraction or expansion, to select the appropriate composition of gypsum, sulfoaluminous clinker according to the invention and Portland cement of the binder to be used.

What is claimed is:

1. Sulfoaluminous clinker containing:

more than 55% by weight of calcium sulfoaluminate phase ($C_4A_3\bar{S}$)

from 10 to 20% by weight of belite phase ($C_2S$)

less than 10% by weight of anhydrite ($C\bar{S}$)

less than 5% by weight of gehlenite phase ($C_2AS$), a free lime content less than about 0.2% by weight, and an iron content (expressed as $Fe_2O_3$) less than about 0.3% by weight.

2. Sulfoaluminous clinker according to claim 1, wherein the clinker comprises:

from about 55% to 72% by weight of calcium sulphoaluminate phase ($C_4A_3S$), and from about 2% to 9% by weight of anhydrite ($C\bar{S}$).

3. Clinker according to claim 1, wherein the total content of colored oxides other than iron oxide is less than about 0.7% by weight.

4. Process for the preparation of the clinker according to claim 1, comprising mixing first materials in compositions such that the following weight proportions of oxides will be respected:

$4 \leq S \leq 10$ $34 \leq A \leq 49$ $37 \leq C \leq 45$ other oxides $\leq 2$ balance to 100 being $\bar{S}$ then roasting this mixture between about 1250° and 1350° C., for a time sufficiently long to combine all the lime, followed by rapid cooling of the mixture in a non-oxidizing atmosphere.

5. Process according to claim 4, wherein the mixture meets each of the following weight proportions in C, A and S oxides:

$3S + 13 \leq C \leq 0.83S + 37$, and $0.81A + 72 \leq C \leq -0.6A + 67$.

6. Process according to claim 4, wherein the cooling is carried out by quenching in water.

7. Process according to claim 4, wherein the cooling is carried out under a nitrogen atmosphere.

8. Process according to claim 4, wherein the clinker is then ground to obtain a Blaine specific surface greater than about 3000 cm²/g.

9. Process according to claim 8, wherein the clinker is ground to obtain a Blaine specific surface greater than about 5000 cm²/g.

10. A binder comprising the clinker according to claim 1, prepared by mixing said clinker with a material that is a source of calcium oxide and/or a source of calcium sulfate.

11. The binder according to claim 10, wherein said clinker is mixed with Portland cement and/or a source of calcium sulfate.

12. Binder comprising from 75 to 90% of sulfoaluminous clinker according to claim 1, and 25 to 10% by weight of a source of calcium sulfate, having a setup time less than or equal to three hours and permitting preparing, according to the EN 196 standard, a mortar which has a compressive strength at 28 days greater than or equal to about 50 MPa.

13. Binder comprising from 20 to 40% of sulfoaluminous clinker according to claim 1, from 50 to 70% of Portland cement and from 5 to 25% of a source of calcium sulfate, having a setup time less than or equal to 10 minutes.

14. Binder according to claim 13 comprising about 30% of sulfoaluminous clinker, about 60% of Portland cement and about 10% of a source of calcium sulfate.

15. Binder comprising 55 to 90% of sulfoaluminous clinker according to claim 1, from 5 to 30% of Portland cement and from 10 to 30% of a source of calcium sulfate, having a setup time comprised between about 30 minutes and 1 hour, and permitting preparing, according to the EN 196 standard, a mortar which has a compressive strength at 5 hours greater than about 20 MPa.

16. Binder according to claim 15, comprising about 60% of sulfoaluminous clinker, about 20% of Portland cement and about 20% of a source of calcium sulfate.

17. Binder according to claim 10, wherein the source of calcium sulfate is gypsum.

* * * * *